United States Patent
Pilz et al.

(10) Patent No.: US 12,552,116 B2
(45) Date of Patent: Feb. 17, 2026

(54) METHOD OF MANUFACTURING A LENS ELEMENT

(71) Applicants: Docter Optics SE, Neustadt an der Orla (DE); HELLA GmbH & Co. KGaA, Lippstadt (DE)

(72) Inventors: Florian Pilz, Neustadt an der Orla (DE); Sven Fröhlich, Neustadt an der Orla (DE); Sebastian Kleineheismann, Lippstadt (DE); Ludwig Knorr, Lippstadt (DE)

(73) Assignees: Docter Optics SE, Neustadt an der Orla (DE); HELLA GmbH & Co. KGaA, Lippstadt (DE)

( * ) Notice: Subject to any disclaimer, the term of this patent is extended or adjusted under 35 U.S.C. 154(b) by 262 days.

(21) Appl. No.: 17/796,780

(22) PCT Filed: Feb. 11, 2021

(86) PCT No.: PCT/DE2021/100136
§ 371 (c)(1),
(2) Date: Aug. 1, 2022

(87) PCT Pub. No.: WO2021/164821
PCT Pub. Date: Aug. 26, 2021

(65) Prior Publication Data
US 2023/0052042 A1    Feb. 16, 2023

(30) Foreign Application Priority Data
Feb. 17, 2020 (DE) .................. 10 2020 104 067.9

(51) Int. Cl.
*B29D 11/00* (2006.01)
*F21S 41/275* (2018.01)

(52) U.S. Cl.
CPC .............. *B29D 11/00403* (2013.01); *B29K 2995/0026* (2013.01); *B29K 2995/0039* (2013.01); *F21S 41/275* (2018.01)

(58) Field of Classification Search
CPC .............. B29D 11/00; B29D 11/00403; B29K 2995/0026; B29K 2995/0039; F21S 41/275
See application file for complete search history.

(56) References Cited

U.S. PATENT DOCUMENTS

| 821,610 A | 5/1906 | Cox |
| 4,666,496 A | 5/1987 | Fecik |

(Continued)

FOREIGN PATENT DOCUMENTS

| CN | 101563297 A | 10/2009 |
| CN | 103547424 A | 1/2014 |

(Continued)

OTHER PUBLICATIONS

International Preliminary Report On Patentability Issued in Corresponding PCT Application No. PCT/DE2021/100136 Dated Aug. 23, 2022.

(Continued)

*Primary Examiner* — John J DeRusso
*Assistant Examiner* — Shibin Liang
(74) *Attorney, Agent, or Firm* — Carter, DeLuca & Farrell LLP

(57) ABSTRACT

The invention concerns a method for producing an optical lens element, in particular for illumination purposes, in particular for producing a headlight lens for a vehicle headlight, in particular for a motor vehicle headlight (10), wherein a pre-lens element (42, 43) is injection molded using at least one mold by heating liquefied transparent plastic, wherein the pre-lens element (42, 43) being cooled (Continued)

in such a way that the plastic solidifies, and at least one optically effective surface of the pre-lens element (42, 43) then being heated in such a way that the plastic on the optically effective surface can be shaped, in particular up to a depth of not more than 1000 micrometers, wherein the pre-lens element (42, 43) is pressed with the optically effective surface in a final contour mold to form the lens element.

11 Claims, 11 Drawing Sheets

(56) References Cited

U.S. PATENT DOCUMENTS

| | | |
|---|---|---|
| 4,756,737 A | 7/1988 | Yoshimura et al. |
| 5,120,343 A | 6/1992 | Monji et al. |
| 5,227,917 A | 7/1993 | Kubo et al. |
| 6,114,039 A | 9/2000 | Rifqi |
| 6,130,777 A | 10/2000 | Yamashita et al. |
| 6,638,450 B2 | 10/2003 | Richard |
| 7,798,688 B2 | 9/2010 | Hamkens |
| 8,251,557 B2 | 8/2012 | Erward |
| 8,998,435 B2 | 4/2015 | Brick |
| 9,358,706 B2 | 6/2016 | Mühle |
| 10,525,645 B2 | 1/2020 | Saito |
| 2001/0033726 A1 | 10/2001 | Shie et al. |
| 2002/0153624 A1 | 10/2002 | Tumlin et al. |
| 2003/0001301 A1 | 1/2003 | Duroux et al. |
| 2004/0244421 A1 | 12/2004 | Kato et al. |
| 2005/0054514 A1 | 3/2005 | Ishioka et al. |
| 2006/0072208 A1 | 4/2006 | Bonitz et al. |
| 2008/0315162 A1 | 12/2008 | Berzon |
| 2009/0000336 A1 | 1/2009 | Rosler |
| 2009/0029117 A1* | 1/2009 | Aoi ................. G02B 3/00 428/192 |
| 2009/0323502 A1 | 12/2009 | Murata et al. |
| 2010/0202154 A1 | 8/2010 | Hamkens |
| 2010/0246008 A1 | 9/2010 | Murata et al. |
| 2011/0266576 A1 | 11/2011 | Engl et al. |
| 2012/0040044 A1 | 2/2012 | Uehira et al. |
| 2013/0221551 A1 | 8/2013 | Genda |
| 2013/0239619 A1 | 9/2013 | Wintzer et al. |
| 2013/0242590 A1 | 9/2013 | Fedosik et al. |
| 2013/0250595 A1 | 9/2013 | Fedosik et al. |
| 2013/0250596 A1 | 9/2013 | Fedosik et al. |
| 2013/0250597 A1 | 9/2013 | Fedosik et al. |
| 2013/0258694 A1 | 10/2013 | Fedosik et al. |
| 2014/0033767 A1 | 2/2014 | Wintzer et al. |
| 2014/0042650 A1* | 2/2014 | Muhle ............. B29C 45/0055 264/2.7 |
| 2014/0286032 A1 | 9/2014 | Fedosik et al. |
| 2014/0332991 A1* | 11/2014 | Giessauf ............ B29C 45/7207 264/1.7 |
| 2014/0347876 A1 | 11/2014 | Fedosik et al. |
| 2015/0036976 A1 | 2/2015 | Wintzer et al. |
| 2015/0109810 A1 | 4/2015 | Wintzer et al. |
| 2015/0124472 A1 | 5/2015 | Wintzer et al. |
| 2015/0224723 A1 | 8/2015 | Hamkens |
| 2015/0292701 A1 | 10/2015 | Wintzer et al. |
| 2015/0300587 A1 | 10/2015 | Scheibner et al. |
| 2015/0330590 A1 | 11/2015 | Wintzer et al. |
| 2015/0369436 A1 | 12/2015 | Wintzer et al. |
| 2016/0082679 A1 | 3/2016 | Kikuchi |
| 2017/0327402 A1 | 11/2017 | Fujii |
| 2018/0251395 A1 | 9/2018 | Akiba et al. |
| 2018/0283639 A1 | 10/2018 | Tessmer et al. |
| 2018/0328558 A1 | 11/2018 | Okubo |
| 2019/0041556 A1 | 2/2019 | Iwata |
| 2019/0331310 A1 | 10/2019 | Wintzer et al. |
| 2020/0195823 A1 | 6/2020 | Furutake |
| 2021/0130738 A1 | 5/2021 | Rougemont |
| 2022/0177345 A1 | 6/2022 | Dittmann et al. |
| 2022/0289612 A1 | 9/2022 | Diatta et al. |
| 2022/0298050 A1 | 9/2022 | Kuppe et al. |
| 2022/0373151 A1 | 11/2022 | Zhang et al. |

FOREIGN PATENT DOCUMENTS

| | | |
|---|---|---|
| CN | 205049796 | 2/2016 |
| CN | 105819674 | 8/2016 |
| CN | 107430215 A | 12/2017 |
| DE | 1 099 964 | 2/1961 |
| DE | 2906858 | 9/1980 |
| DE | 36 02 262 | 5/1987 |
| DE | 299 14 114 | 11/1999 |
| DE | 69701714 | 2/2001 |
| DE | 102 26 471 | 1/2004 |
| DE | 10 2005 009 556 | 9/2005 |
| DE | 10116139 B4 | 4/2006 |
| DE | 102006034431 A1 | 1/2008 |
| DE | 10 2008 034153 | 1/2010 |
| DE | 102008054029 | 5/2010 |
| DE | 10100515 B4 | 12/2010 |
| DE | 102011114636 A1 | 4/2013 |
| DE | 10 2012 205 196 | 10/2013 |
| DE | 20 2014 100462 | 3/2014 |
| DE | 10 2015 001609 | 8/2016 |
| DE | 10 2015 007 832 | 12/2016 |
| DE | 102016102408 A1 | 6/2017 |
| DE | 102014000474 A1 | 10/2017 |
| DE | 10 2017 105 888 | 9/2018 |
| DE | 10 2015 012 324 | 6/2019 |
| DE | 102018002267 A1 | 9/2019 |
| DE | 10 2020 115078 | 1/2021 |
| DE | 102021130715 A1 | 6/2022 |
| DE | 102021105560 A1 | 9/2022 |
| EP | 1954642 B1 | 4/2009 |
| EP | 2402140 | 1/2012 |
| EP | 2666620 | 11/2013 |
| EP | 3312501 | 4/2018 |
| EP | 3520983 | 8/2019 |
| EP | 3575362 | 12/2019 |
| JP | 01072822 | 3/1989 |
| JP | H06166526 | 6/1994 |
| JP | H06-286754 | 10/1994 |
| JP | H07330347 A | 12/1995 |
| JP | H08-336833 A | 12/1996 |
| JP | 2002160256 | 6/2002 |
| JP | 2003048728 A | 2/2003 |
| JP | 2003246630 | 9/2003 |
| JP | 2004009379 | 1/2004 |
| JP | 2006062359 | 3/2006 |
| JP | 4400798 | 1/2010 |
| JP | 2010046895 | 3/2010 |
| JP | 2018118900 | 8/2019 |
| JP | 2019135202 | 8/2019 |
| KR | 20160028901 | 3/2016 |
| KR | 101971276 | 4/2019 |
| WO | 2004/096724 | 11/2004 |
| WO | 2009/036739 | 3/2009 |
| WO | 2009/109209 | 9/2009 |
| WO | 2012072187 A2 | 6/2012 |
| WO | 2012072188 A1 | 6/2012 |
| WO | 2012072189 A2 | 6/2012 |
| WO | 2012072190 A2 | 6/2012 |
| WO | 2012072191 A2 | 6/2012 |
| WO | 2012072192 | 6/2012 |
| WO | 2012072192 A1 | 6/2012 |
| WO | 2012072193 A2 | 6/2012 |
| WO | 2012130352 A1 | 10/2012 |
| WO | 2013068053 A1 | 5/2013 |
| WO | 2013068063 A1 | 5/2013 |
| WO | 2013123954 A1 | 8/2013 |
| WO | 2013135259 A1 | 9/2013 |
| WO | 2013159847 A1 | 10/2013 |
| WO | 2013170923 A1 | 11/2013 |
| WO | 2013178311 A1 | 12/2013 |
| WO | 2014072003 A1 | 5/2014 |
| WO | 2014114307 A1 | 7/2014 |
| WO | 2014114308 A1 | 7/2014 |
| WO | 2014114309 A1 | 7/2014 |

(56) References Cited

FOREIGN PATENT DOCUMENTS

| WO | 2014131426 | A1 | 9/2014 |
|---|---|---|---|
| WO | 2014/161014 | | 10/2014 |
| WO | 2017059945 | A1 | 4/2017 |
| WO | 2017/207079 | | 12/2017 |
| WO | 2017215775 | A1 | 12/2017 |
| WO | 2019/072326 | | 4/2019 |
| WO | 2019/179571 | | 9/2019 |
| WO | 2019243343 | A1 | 12/2019 |
| WO | 2021/008657 | | 1/2021 |
| WO | 2021008647 | | 1/2021 |

OTHER PUBLICATIONS

Audi Matrix LED-Scheinwerfer, https://web.archive.org/web20150109234745/http://audi.de/content/de/brand/de/vorsprung_durch_technik/content/2013/08/Audi-A8, Jun. 28, 2022, 3 pages.
Veb Jena Glaswerk Schott & Gen, "Structure and Nature of Glass", 1st Edition, Sep. 1, 1974, 3 pages.
Vollmer, Alfred, "Matrix-LED-und Laserlicht bietet viele Vorteile", all-electronics, https://www.all-electronics.de/automotive-transportation/matrix-led-under-laserlicht-bietet-viele-vorteile.html, Apr. 15, 2014, 12 pages.
Schafer, Patrick "Hella bringt neues SSL-HD-Matrix Lichtsystem auf den Markt", Sep. 18, 2019, Springer Professional, 3 pages.
Authors' Collective, "Glass Technology", Glastechnik, Leipzig 1972, 12 pages.
International Search Report and Written Opinion Issued Feb. 1, 2022 For Corresponding PCT Application No. PCT/DE2021/100858.
Audi—Vorsprung durch Technik, http://web.archive.org/web/20150109234745/http://www.audi.de/content/de/brand/de/vorsprung_durch_technik/content/2013/08/Audi-A8-erstrahlt-in-ne, May 22, 2023.
Vehicle Bodies, Bosch Automotive Handbook, 9th Edition, 2014, p. 1040.
Digital Light: Millions of Pixels on the Road, https://www.al-lighting.com/news/article/digital-light-millions-of-pixels—Oct. 31, 2018.
Hella bringt neues SSL-HD-Matrix-Lichtsystem auf den Markt, https://www.springerprofessional.de/fahrzeug-lichttechnik/fahrzeugsicherheit/hella-bringt-neues-ssl-hd-matrix-lichtsystem-auf-den-markt/17182758, Sep. 18, 2019.
Von Alfred Vollmer, "Matrix-LED-und Laserlicht bietet viele Vorteile", https://www.all-electronics.de/automotive-transportation/matrix-led-und-laserlicht-bietet-viele-vorteile.html, Apr. 15, 2014.
SSL|HD: hochintegriertes HD-LED-Lichtsystem von Hella, https://www.highlight-web.de/5874/hella-ssl-hd/, Sep. 13, 2019.
Hopmann, Christian et al., "Technologie des Spritzgießens" Lern- und Arbeitsbuch, 2017, pp. 19, 29, 57-59, 64-70.
Unser Digital Light SSL | HD-Lichtsystem: ein neuer Meilenstein der automobilen Lichttechnik | HELLA, https://www.hella.com/techworld/de/Lounge/Unser-Digital-Light-SSL-HD-Lichtsystem-ein-neuer-Meilenstein-der-automobilen-Lichttechnik-55548/, 11 pages.
International Search Report and Written Opinion Issued Feb. 4, 2022 For Corresponding PCT Application No. PCT/DE2021/100840.
International Preliminary Report On Patentability Issued May 8, 2023 For PCT/DE2021/100858.
International Search Report Issued Jan. 26, 2021 For Corresponding PCT Application No. PCT/DE2020/100860.
International Search Report and Written Opinion Issued May 20, 2019 For Corresponding PCT Application No. PCT/DE2019/100249.
International Preliminary Report On Patentability Issued On Jan. 18, 2022 In Corresponding PCT Application No. PCT/DE2020/100478.
International Search Report and Written Opinion Issued On Sep. 16, 2020 In Corresponding PCT Application No. PCT/DE2020/100478.
Office Action Dated Mar. 20, 2020 For Corresponding Patent Application No. DE 10 2019 119 040.1.
Office Action Dated Feb. 19, 2020 For Corresponding Patent Application No. DE 10 2019 119 042.8.
International Preliminary Report On Patentability Issued On Jan. 18, 2022 In Corresponding PCT Application No. PCT/DE2020/100609.
International Search Report and Written Opinion Issued On Oct. 16, 2020 In Corresponding PCT Application No. PCT/DE2020/100609.
International Preliminary Report On Patentability Issued On Sep. 22, 2020 For Corresponding PCT Application No. PCT/DE2019/100249.
German Office Action Dated Jul. 13, 2021 For Corresponding Patent Application No. DE 10 2020 127 638.9.
International Search Report and Written Opinion Issued On Apr. 8, 2021 In Corresponding PCT Application No. PCT/DE2020/101007.
International Preliminary Report On Patentability Issued On May 17, 2022 For Corresponding PCT Application No. PCT/DE2020/101007.
Search Report Issued On Nov. 22, 2021 For Corresponding Patent Application No. DE 10 2021 105 560.1.
International Preliminary Report On Patentability Issued On Apr. 12, 2022 For Corresponding PCT Application No. PCT/DE2020/100860.
International Search Report and Written Opinion Issued May 6, 2021 For PCT/DE2021/100035.
International Preliminary Report On Patentability Issued On Jul. 19, 2022 For Corresponding PCT Application No. PCT/DE2021/100035.
International Search Report and Written Opinion Issued May 25, 2021 For PCT/DE2021/100136.
Chinese Office Action issued by the China National Intellectual Property Administration on Jul. 12, 2025 in corresponding CN Patent Application No. 202180010272.8, with English translation.

* cited by examiner

METHOD OF MANUFACTURING A LENS ELEMENT

FIELD OF THE DISCLOSURE

The present disclosure concerns a method for manufacturing an (optical) lens element, for example for illumination purposes, for example a method for manufacturing a headlight lens for a vehicle headlight, for example for a motor vehicle headlight.

BACKGROUND

DE 10 2007 037 204 A1 discloses a method for producing an optical lens element, for example for illumination purposes, for example for producing a headlight lens for a vehicle headlight, for example for a motor vehicle headlight, wherein a blank is formed from a transparent, for example thermoplastic, for example essentially liquid plastic compound, for example by means of an injection molding process in an injection mold, and wherein the blank is subsequently pressed by means of a final contour mold to form the lens element, for example blank. WO 2014/161014 A1, WO 2019/179571 A1 and U.S. Pat. No. 10,183,429 B2 (incorporated by reference in its entirety) disclose a method for producing an injection molded part, for example an optical element, wherein an injection molding material is molded at at least two injection stations by means of at least two injection operations, wherein a preform produced in one of the at least two injection operations is cooled in a cooling station between the at least two injection operations.

SUMMARY

The present disclosure concerns a method according to the claims. The disclosure relates, inter alia, to a method for producing an optical lens element, for example for illumination purposes, for example for producing a headlight lens for a vehicle headlight, for example for a motor vehicle headlight, wherein a pre-lens element is injection molded using at least one mold or a (second) injection mold by transparent, for example amorphous plastic or polymer, the pre-lens element being cooled in such a way that the plastic solidifies, and at least one optically effective surface of the pre-lens element then being heated in such a way that the plastic is moldable on the optically effective surface, for example up to a depth of no more than 1000 micrometers, wherein the pre-lens element is pressed into a final contour mold to the lens element with the optically effective surface.

DETAILED DESCRIPTION

Figure 1:
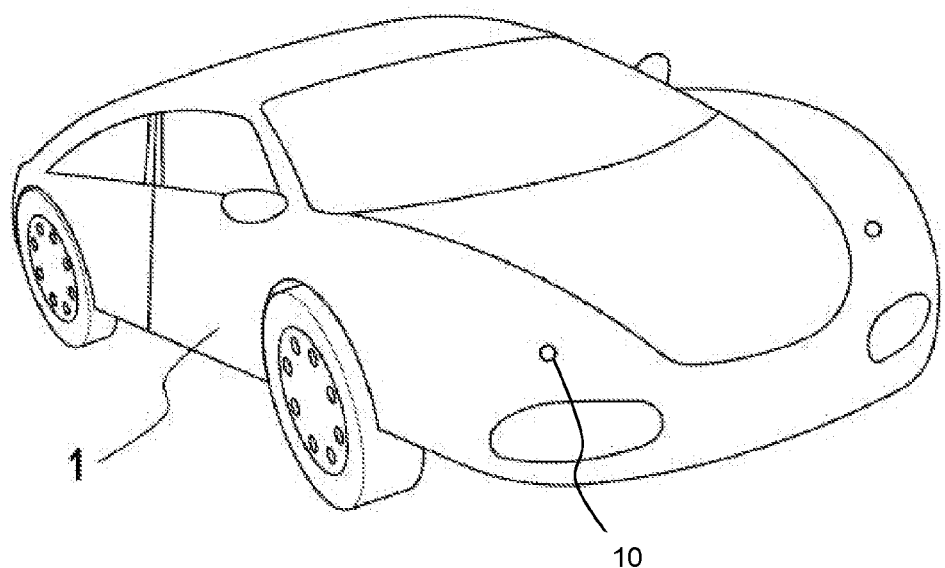
FIG. 1 shows an embodiment for a motor vehicle with a vehicle headlight.

The present disclosure concerns a method according to the claims. The disclosure relates, inter alia, to a method for producing an optical lens element, for example for illumination purposes, for example for producing a headlight lens for a vehicle headlight, for example for a motor vehicle headlight, wherein a pre-lens element is injection molded using at least one mold or a (second) injection mold by transparent, for example amorphous plastic or polymer, the pre-lens element being cooled in such a way that the plastic solidifies, and at least one optically effective surface of the pre-lens element then being heated in such a way that the plastic is moldable on the optically effective surface, for example up to a depth of no more than 1000 micrometers, for example no more than 500 micrometers, for example no more than 100 micrometers, wherein the pre-lens element with the optically effective surface is pressed into a final contour mold to the lens element.

The present disclosure concerns further, for example, a method for producing an optical lens element, for example for illumination purposes, for example for producing a headlight lens for a vehicle headlight, for example for a motor vehicle headlight, wherein a pre-lens element is injection-molded using at least one mold by heating liquefied transparent plastic, wherein the pre-lens element is cooled in such a way that the plastic solidifies, and wherein subsequently at least one surface of the pre-lens element provided as an optically effective surface is heated in such a way that the plastic at the surface provided as an optically effective surface is moldable, for example up to a depth of not more than 1000 micrometers, for example not more than 500 micrometers, for example not more than 100 micrometers, wherein the pre-lens element is pressed into a final contour mold to the lens element with the optically effective surface.

In a further embodiment, injection molding material (transparent plastic liquefied by heating) is injection molded by means of a first injection mold to form a pre-molded part comprising at least one preform and at least one first sprue connected to the preform, wherein the pre-molded part is thereafter cooled outside the first injection mold, and wherein the pre-molded part is thereafter injected and/or over molded in a second injection mold to form an injection molded part comprising at least the pre-lens element and optionally at least a second sprue or a total sprue formed from the first sprue and the second sprue.

The present disclosure concerns further, for example, a method for producing an optical lens element, for example for illumination purposes, for example for producing a headlight lens for a vehicle headlight, for example for a motor vehicle headlight, wherein injection molding material (transparent plastic liquefied by heating) is injection molded using a first injection mold to form a preform and/or a pre-molded part, which comprises at least one preform and at least one first sprue connected to the preform, wherein the preform and/or the pre-molded part is (directly or indirectly, i.e. after one or more intermediate steps) is then cooled outside the first injection mold, and wherein the preform is then at least partially over molded and/or injection molded in a second injection mold by means of further injection molding material (transparent plastic liquefied by heating) to form a pre-lens element, wherein the pre-lens element is cooled in such a way that the plastic solidifies (for example completely) and wherein subsequently at least one surface of the pre-lens element provided as an optically effective surface is heated in such a way that the plastic at the surface provided as an optically effective surface is moldable, for example up to a depth of not more than 1000 micrometers, for example not more than 500 micrometers, for example not more than 100 micrometers, wherein the pre-lens element is pressed into a final contour mold to the lens element with the optically effective surface. For purposes of this disclosure, plastic is particularly considered solidified when it has a temperature that is less than TG (transformation temperature) of the plastic. For example, plastic is considered to be completely solidified for the purposes of this disclosure when the corresponding element of plastic consistently has a temperature that is less than TG (transformation temperature) of the plastic.

In one embodiment, at least 90%, for example at least 95%, of the pre-lens element is provided to have a temperature below TG (transformation temperature) of the plastic when the pre-lens element is molded in a final contour mold to the lens element having the optically effective surface.

The heating of a pre-lens element in the sense that there is a local increase in the temperature of the pre-lens element above TG, i.e. the transformation temperature or softening temperature, at the surface can take place outside or inside a tool, i.e. for example a final contour mold. The transfer of heat to the pre-lens element may be by conduction, convection, and/or radiation. For example, the pre-lens element may be exposed to heat radiation, such as in the form of infrared radiation from an infrared heater or heat radiation from an induction heater. Subsequently, pressing or embossing takes place in a final contour mold.

However, heating can additionally or alternatively also take place in the final contour mold or by means of the final contour mold. Parts of the final contour mold can have different temperatures. It may be provided that conduction or heating of the pre-lens element by means of conduction takes place through a lower mold, whereas heating of the upper surface of the pre-lens element takes place by convection and/or by thermal radiation (but possibly also by conduction).

When heat is transferred by convection, the heated mold or final contour mold or the forming part of the final contour mold dwells with a small embossing stroke, i.e. a small distance from the pre-lens element, until edge layer temperatures (surface temperatures) above TG are reached. The stroke is then executed.

However, it is also possible to provide so-called active elements in the final contour mold, such as ceramic radiators, which also serve to reshape the edge layer after the embossing stroke. However, a two-dimensional active element can also be provided for tempering. For example, a contour-matched resistance heating element, such as a milled copper insert, may be provided which is thermally insulated from the rest of the mold, for example by a lacquer. However, provision may also be made for a contactable mold coating to serve as resistance heating element. Heating channels may also be provided in the mold. In one embodiment, the final contour mold is a closed final contour cooling mold in which the pre-lens element is cooled. In another embodiment, the final contour cooling mold has at least two forming parts that are interlocked or the final contour mold has at least one lower mold and at least one upper mold, wherein the pressure is caused by the weight of the upper mold so that the lens element is formed from the pre-lens element. In a further embodiment, the final contour cooling mold has a predetermined temperature. In a further embodiment, the final contour cooling mold is part of an injection mold and is removed with the pre-lens element from the injection molding machine by means of which injection molding was last performed.

In a further embodiment, the optical lens element comprises an optically effective lens body and an optically non-effective rim, wherein the second sprue is directly connected to the optical lens body (and for example not indirectly via the optically non-effective rim). In a further embodiment, the second sprue extends at least partially along the first sprue (wherein the first sprue and the second sprue are formed in different steps and for example form a common sprue (=total sprue) after solidification. For example, it is provided that the first sprue forms a partial wall of the cavity for the second sprue.

In a further embodiment, the pre-molded part comprises at least a second preform, wherein the at least first sprue connects the first preform to the second preform. In a further embodiment, the injection molded part comprises at least a second optical lens element, wherein the at least second sprue and/or the total sprue connects the first optical pre-lens element to the second optical pre-lens element.

In a further embodiment, the optically non-effective rim is formed solely during injection molding of the injection molded part. In a further embodiment, the injection molded part is held on the second sprue alone or on the total sprue during cooling. In a further embodiment, the second sprue extends for its predominant portion along the first sprue. In a further embodiment, the pre-molded part is optionally cooled in a first cooling station or in a second cooling station. In a further embodiment, the volume of the first sprue is at least 30% of the pre-molded part. In a further embodiment, the volume of the second sprue is at least 30% of the injection molded part. In a further embodiment, the first sprue comprises a cross-sectional area of at least 25 mm$^2$ or of at least 40 mm$^2$. In a further embodiment, the second sprue comprises a cross-sectional area of at least 25 mm$^2$ or of at least 40 mm$^2$. In a further embodiment, the first optical (automotive-) lens element is separated from the total sprue. In a further embodiment, the at least second optical pre-lens element is separated from the total sprue. In a further embodiment, it is provided that at least 8 pre-lens elements and/or at least 16 preforms are molded in one molding step.

In a further embodiment, it is provided that at least 8 injection molded parts and/or at least 8 pre-molded parts comprising a sprue and at least two preforms are molded in one step. In a further embodiment, it is provided that in one pressing step at least 16 injection molded parts and/or at least 16 pre-molded parts, comprising a sprue and at least two pre-lens blanks or preforms, are pressed in one step. In a further embodiment, the pressing device comprises at least one hot runner. The hot runner or the predominant part of the hot runner for example has a cross-sectional area of not less than 25 mm$^2$ for example of not less than 40 mm$^2$. For the purposes of the present disclosure, the cross-sectional area of a hot runner is for example a cross-sectional area orthogonal to the longitudinal direction of the hot runner or orthogonal to the flow direction/average flow direction of the liquid plastic in the hot runner. For example, at least two hot runners may also be provided, a first hot runner and at least a second hot runner. It may be provided that the first hot runner is associated with the first injection mold and the second hot runner is associated with the second injection mold or supplies or fills the latter with liquid plastic. In a further embodiment, a pre-molded part or pre-lens element remains in the mold (synonymous with injection mold) or in the closed mold for 130 to 180 seconds or no more than 180 seconds. In a further embodiment, this includes both injection molding time and post molding time.

For exampleFor example, injection molding is performed at a pressure of not less than 600 bar, for example not less than 800 bar. For example, injection molding is carried out at a pressure of not more than 1000 bar. For example, injection molding is carried out at a pressure of 800 bar to 1000 bar.

For example, it is provided that the pressing pressure by means of which the molds or partial molds of a final contour mold are pressed against each other is not greater than 1000 bar. It can be provided that the pressing pressure for pressing the lens element from the pre-lens element by means of the final contour mold does not exceed 10 bar.

In one embodiment, the final contour mold is used to form a diffractive optics DOE or a light-scattering surface structure into the optically effective surface of the lens element to be formed. A suitable light-scattering surface structure comprises, for example, a modulation and/or a (surface) roughness of at least 0.05 µm, for example at least 0.08 µm, or is designed as a modulation with a (surface-) roughness of at least 0.05 µm, for example at least 0.08 µm. Roughness in the sense of this disclosure shall be defined for example as Ra, for example according to ISO 4287. In a further embodiment of the present disclosure, the light-scattering surface structure may comprise a structure mimicking a golf ball surface or be configured as a structure mimicking a golf ball surface. Suitable light scattering surface structures are disclosed, for example, in DE 10 2005 009 556 A1, DE 102 26 471 B4 and DE 299 14 114 U1. Other usable embodiments of light-scattering surface structures are disclosed in German patent specification 1 099 964, DE 36 02 262 C2, DE 40 31 352 A1, U.S. Pat. No. 6,130,777, US 2001/0033726 A1, JP 2010-123307 A, JP 2009-159810 A, WO 2018/177757 A1, and JP 2001-147403 A.

The disclosure further relates to a method for manufacturing a vehicle headlight, wherein an optical lens element manufactured according to an aforementioned method is installed in a headlight housing.

The disclosure further relates to a method for manufacturing a vehicle headlight, wherein an optical lens element manufactured according to an aforementioned method is placed in a headlight housing and assembled together with at least one light source to form a vehicle headlight.

The disclosure further relates to a method for producing a vehicle headlight, wherein an optical lens element produced according to a method mentioned above, for example in a headlight housing is assembled together with at least one light source and a shield to form a vehicle headlight in such a way that an edge of the shield can be imaged by the lens element as a bright-dark-boundary by means of light emitted by the light source.

The disclosure further relates to a method for producing a vehicle headlight for implementing matrix light and/or adaptive high beam (for example HD-SSL), wherein an optical lens element produced in accordance with an aforementioned method, is installed, for example in a headlight housing, together with at least one light source and an attachment optics for generating a light distribution from light generated by the light source on an output surface of the attachment optics to form a vehicle headlight in such a way that the light distribution can be imaged by means of the lens element as secondary optics. Particularly suitable attachment optics are disclosed, for example, in U.S. Pat. No. 9,689,545 B2 (incorporated by reference in its entirety), U.S. Pat. No. 9,851,065 B2 (incorporated by reference in its entirety) and DE 11 2017 000 180 A5 (incorporated by reference in its entirety).

The disclosure further relates to a method for producing a vehicle headlight for implementing matrix light and/or adaptive high beam, wherein an optical lens element produced according to an aforementioned method is assembled together with at least one further lens element to form an objective, wherein, for example in a headlight housing, at least one light source and an attachment optics for producing a light distribution of light produced by the light source at an output surface of the attachment optics is assembled to form a vehicle headlight in such a way that the light distribution can be imaged by means of the objective.

The disclosure further relates to a method for manufacturing a motor vehicle, wherein a vehicle headlight manufactured according to a method mentioned above is installed in the front of the motor vehicle.

The disclosure further relates to a method for manufacturing a motor vehicle, wherein a vehicle headlight manufactured according to a method mentioned above is installed in the front of the motor vehicle in such a way that the light distribution can be mapped onto an environment in front of the motor vehicle.

Transparent plastics, for example, are processed in the manufacture of optical lens elements. Examples are PC, PMMA, COC, COP and amorphous PA. Elastic materials, such as thermoplastic elastomers, can also be processed.

An (optical) lens element in the sense of this disclosure is for example a headlight lens. An (optical) lens element within the meaning of this disclosure is for example a converging lens.

A finished pressed lens (or lens element) in the sense of this disclosure is for example a lens (or lens element) which, without a sprue, has a volume of at least 50 cm$^3$ and/or a thickness of at least 25 mm. For example, the following terminology is used: A pre-molded part comprises at least one sprue and at least one preform. A pre-molded part may also comprise a sprue with two or more preforms. An injection molded part includes at least one sprue and at least one lens element, or at least one sprue and at least one lens. A lens element or lens comprises a lens body and optionally a lens rim or edge.

In the aforementioned sense, the term injection mold is intended to be synonymous for example with injection cavity and/or tool. It is for example provided that the first injection mold is part (of a first injection tool) of a first injection molding machine and the second injection mold is part of a second injection tool, for example a second injection molding machine. However, it may also be provided that the first injection mold and the second injection mold are implemented in one injection mold, for example also in one injection molding machine. For an example, please refer to the description of FIG. 14.

In this disclosure, a sprue is to be understood for example as that part of a pre-molded part or an injection-molded part which does not belong to the subsequent lens element. The sprue within the meaning of this disclosure is created for example by the plastic (melt) solidified in the feed channels to the casting mold. For example, it is provided that the sprue in the sense of this disclosure is a part whose volume does not contribute to the volume of the "useful part", i.e. the volume of the lens element. Sprue within the meaning of the present disclosure particularly includes what is referred to in English as "sprue", "runner" and "gate" or the material solidified therein. For example, a sprue within the meaning of this disclosure or terminology is not limited to "sprue" in English.

The disclosed methods are particularly suitable for lenses with curved surfaces on both sides, i.e. for lenses in which both the light entrance surface and the light exit surface are curved. The methods are particularly suitable for lenses which are convexly curved on the light entrance side and on the light exit side. The methods described are particularly suitable for lenses as disclosed in U.S. Pat. No. 9,506,614 B2 (incorporated by reference in its entirety).

A cooling track in the sense of this disclosure is synonymous with the term cooling path. A cooling line or cooling track in the sense of this disclosure enables the slow cooling of a part that is moved through the cooling line or cooling track with the addition of heat. In this process, the temperature to which the part is subjected decreases with increasing residence time and progress on the cooling track. For example, it is provided that the part to be cooled is deposited on a transport element in analogy to the transport element according to WO 2019/072325 A1.

A rim or a lens edge in the sense of this disclosure is for example three-dimensional. A rim or a lens edge in the sense of this disclosure for example has a volume. A rim or a lens edge in the sense of this disclosure comprises for example a support shoulder in the direction of the curved surface. It may be provided that the support shoulder is used as a reference or reference surface when grinding the flat surface. For example, it is provided that the support shoulder is in a fixed relationship to the blank-pressed surface.

An attachment optics in the sense of this disclosure is arranged for example between the objective and the light source arrangement. An attachment optics within the meaning of this disclosure is for example arranged in the light path between the objective and the light source arrangement. An attachment optics within the meaning of this disclosure is for example an optical component for shaping a light distribution as a function of light generated by the light source arrangement and irradiated by the latter into the attachment optics. In this context, the generation or shaping of a light distribution is performed for example by TIR, i.e. by total reflection. However, it can also be provided that the generation or shaping of a light distribution is implemented by light refraction or light diffraction. This method is also particularly for example applicable for lenses with at least one flat surface or at least one concave surface. It is especially applicable also for meniscus and bi-concave lenses.

A vehicle headlight within the meaning of the present disclosure is, for example, an adaptive high beam or matrix light or SSL or HD-SSL.

Motor vehicle in the sense of the disclosure is for example a land vehicle which can be used individually in road traffic. Motor vehicles within the meaning of the disclosure are for example not limited to land vehicles with internal combustion engines.

Figure 2:
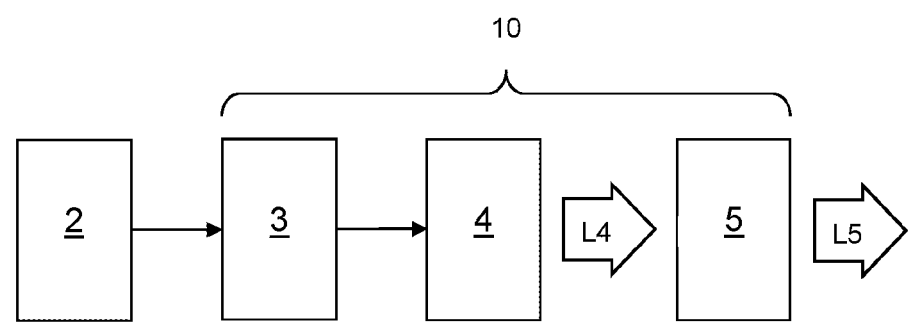
FIG. 2 shows an embodiment of a vehicle headlight according to FIG. 1 in principle.
Figure 3:
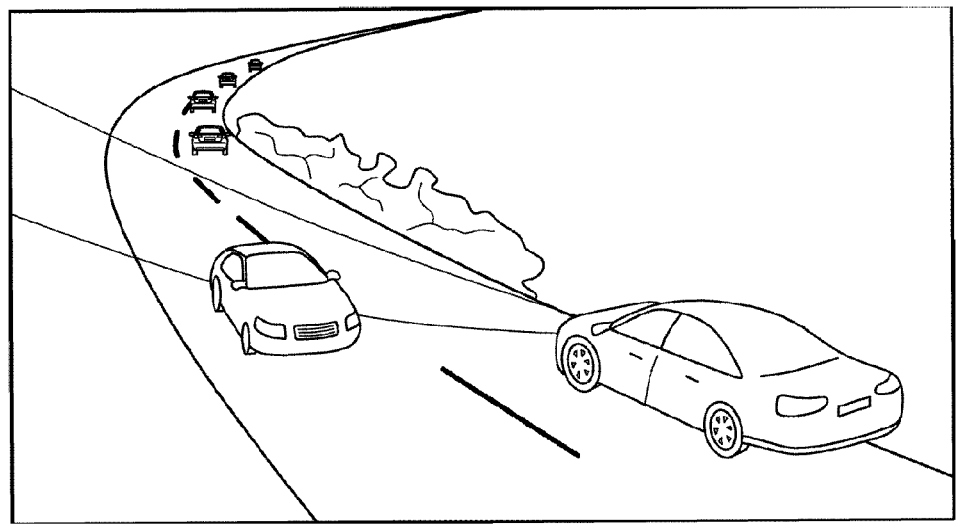
FIG. 3 shows an embodiment of matrix light or adaptive high beam.
Figure 4:
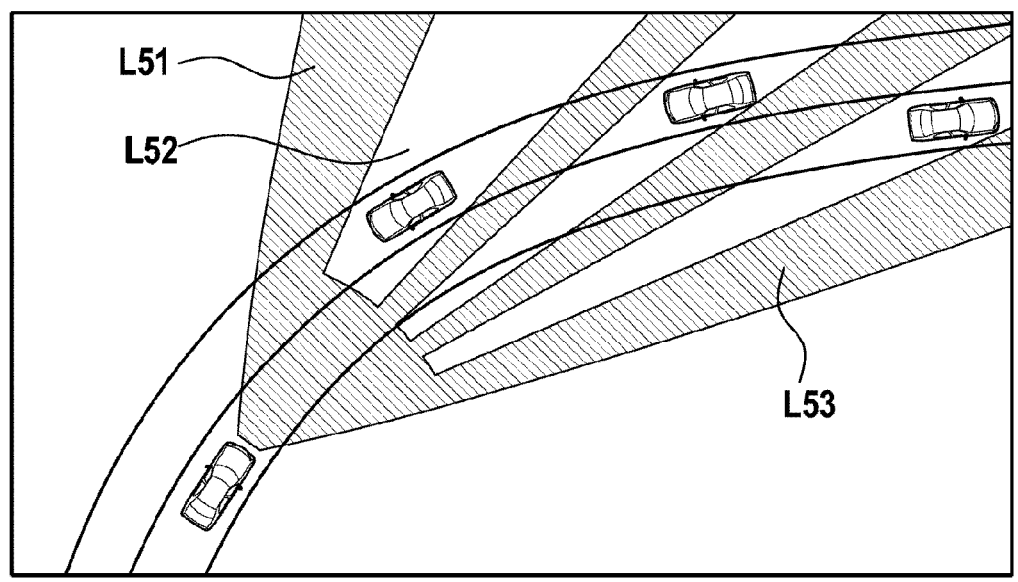
FIG. 4 shows another embodiment of matrix light or adaptive high beam.

FIG. 1 shows a motor vehicle 1 with an adaptive headlight or vehicle headlight 10 for situation-dependent or traffic-dependent illumination of the surroundings or the road ahead of the motor vehicle 1 as a function of environmental sensors 2 as shown in FIG. 2 of the motor vehicle 1. For this purpose, the vehicle headlight 10 shown schematically in FIG. 2 has an illumination device 4 which is driven by means of a controller 3 of the vehicle headlight 10. Light L4 generated by the illumination device 4 is emitted from the vehicle headlight 10 as an illumination pattern L5 by means of an objective 5, which may comprise one or more optical lens elements or headlight lenses. Examples of corresponding illumination patterns are shown in FIG. 3 and FIG. 4, where FIG. 3 is taken from web.archive.org/web/20150109234745/http://www.audi.de/content/de/brand/de/vorsprung_durch_technik/content/2013/08/Audi-A8-er-strahlhlt-in-neuem-Licht.html (accessed Sep. 5, 2019) and FIG. 4 is taken from the website www.all-electronics.de/matrix-led-und-laserlicht-bietet-viele-vorteile/ (accessed Sep. 2, 2019). In the embodiment shown in FIG. 4, the illumination pattern L5 includes flared areas L51, dimmed areas L52, and curve light L53. A further headlight system can be taken from the website www.next-mobility.news/led-imfahrzeug-die-rolle-der-matrixscheinwerfer-und-was-sie-leisten-a-756004/ (accessed Sep. 2, 2019).

Figure 5:
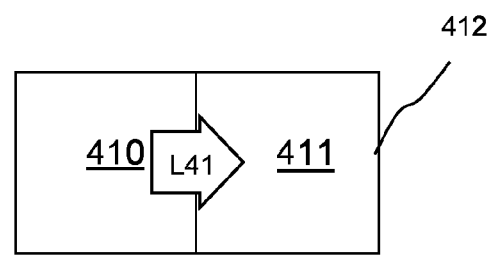
FIG. 5 shows an embodiment of an illumination device of a vehicle headlight according to FIG. 2.

FIG. 5 shows an embodiment for the illumination device 4, wherein it comprises a light source arrangement 410 with a plurality of individually adjustable areas or pixels. For example, up to 100 pixels, up to 1000 pixels or not less than 1000 pixels may be provided, which are individually drivable by means of the controller 3 in the sense that they may be individually switched on or off, for example. It may be provided that the illumination device 4 further comprises an attachment optics 411 for generating an illumination pattern (such as L4) at the light exit surface 412 depending on the correspondingly controlled areas or pixels of the light source arrangement 410 or corresponding to the light L41 irradiated into the attachment optics 411.

Figure 6:
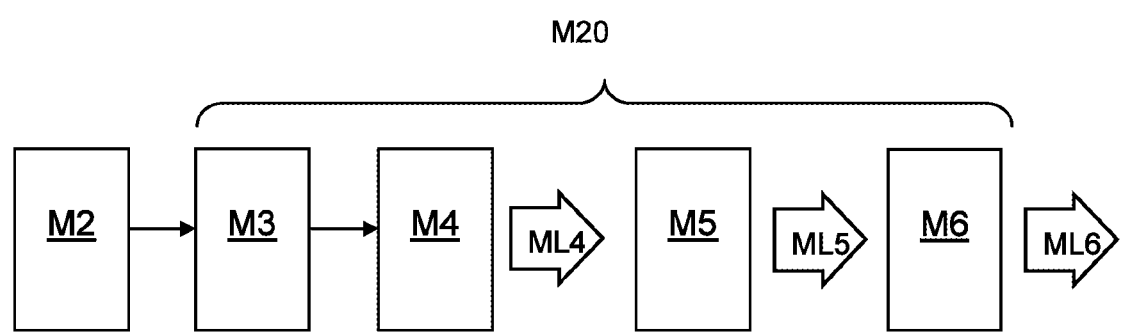
FIG. 6 shows another embodiment of an alternative vehicle headlight.

Another suitable field of application for lenses manufactured according to the disclosure is disclosed, for example, in DE 10 2017 105 888 A1 or the headlight described with reference to FIG. 6. Thereby, FIG. 6 exemplarily shows a light module (headlight) M20 comprising a light emitting unit M4 with a plurality of matrix-like arranged (point-like) light sources, each emitting light ML4 (with a Lambertian radiation characteristic), and further comprising a concave lens M5 and a projection optics M6. In the example shown in DE 10 2017 105 888 A1 according to FIG. 6, the projection optics M6 comprises two lenses arranged one behind the other in the optical path, which have been manufactured according to the method corresponding to the disclosed process. The projection optics M6 reproduces the light ML4 emitted by the light emitting unit M4 and, after passing through the concave lens M5, further shaped light ML5 as a resulting light distribution ML6 of the light module M20 on a roadway in front of the motor vehicle in which the light module or the headlight is (have been) installed.

The light module M20 has a controller designated with reference sign M3, which controls the light emitting unit M4 as a function of the values of a sensor system or environment sensor system M2. The concave lens M5 has a concavely curved exit surface on the side facing away from the light emitting unit M4. The exit surface of the concave lens M5 redirects light ML4 irradiated into the concave lens M5 by the light emitting unit M4 with a large irradiation angle toward the edge of the concave lens by means of total reflection, so that it does not pass through the projection optics M6. According to DE 10 2017 105 888 A1, light beams emitted at a 'large beam angle' by the light emitting unit M4 are those light beams which (without arrangement of the concave lens M5 in the beam path) would be poorly imaged, for example blurred, on the roadway by means of the projection optics M6 due to optical aberrations and/or which could lead to stray light which reduces the contrast of the image on the roadway (see also DE 10 2017 105 888 A1). It can be provided that the projection optics M6 can only sharply image light with an aperture angle limited to approximately +/−20°. Light beams with aperture angles greater than +/−20°, for example greater than +/−30°, are thus prevented from hitting the projection optics M6 by the arrangement of the concave lens M5 in the beam path.

The light emitting unit M4 can be designed differently. According to one embodiment, the individual point-shaped light sources of the light emitting unit M4 each comprise a semiconductor light source, for example a light emitting diode (LED). The LEDs can be selectively controlled individually or in groups in order to switch them (half conductors light sources) on or off or to dim them. For example, the M20 light module has more than 1,000 individually controllable LEDs. For example, the light module M20 may be designed as a so-called μAFS (micro-structured adaptive front-lighting system) light module.

According to an alternative possibility, the light emitting unit M4 comprises a semiconductor light source and a DLP or micromirror array comprising a plurality of micromirrors that can be individually controlled and tilted, each of the micromirrors forming one of the point light sources of the light emitting unit M4. For example, the micromirror array comprises at least 1 million micromirrors that can be tilted, for example, at a frequency of up to 5,000 Hz.

Figure 7:
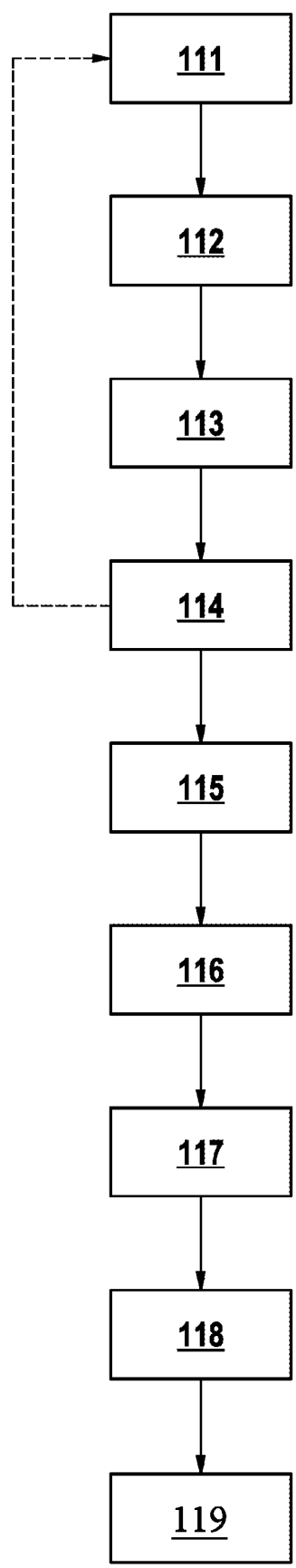
FIG. 7 shows an embodiment of a method for producing an automotive lens element.
Figure 8A:
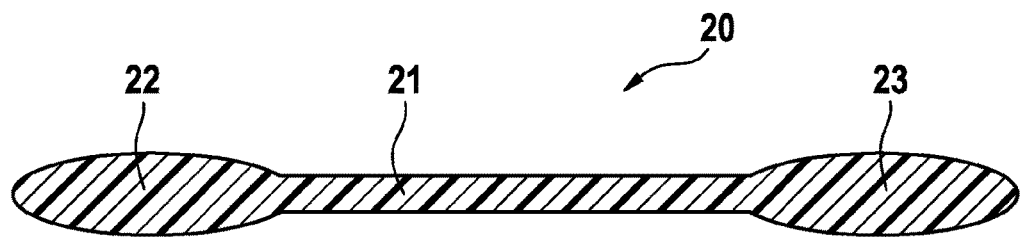
FIG. 8A shows an embodiment of a pre-molded part.
Figure 10:
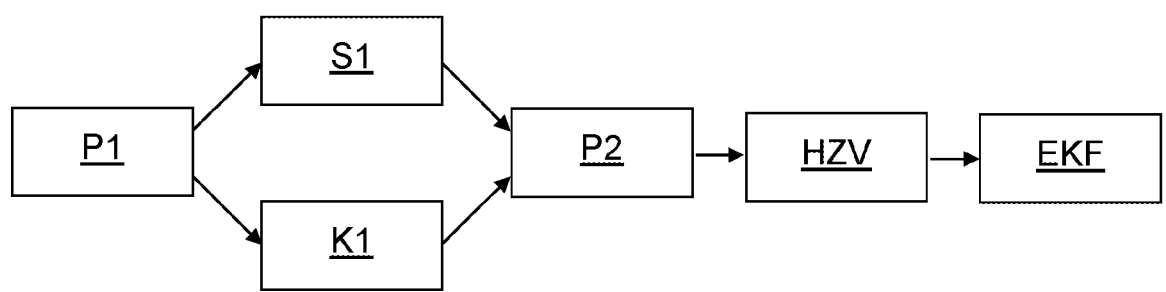
FIG. 10 shows a schematic view of an interlinking of two injection molding machines for the production of a pre-lens element and a subsequent thermal surface treatment in connection with a pressing step to achieve a contour of an optically effective surface (of a lens element) within a predetermined tolerance.

FIG. 7 describes—using a device according to FIG. 10 as an example—an embodiment of a method for producing an (optical) lens element or an (optical) auto motive lens element. Here, in a step 111, a pre-molded part 20 as shown in FIG. 8A is injection-molded (injected). In FIG. 8A, reference sign 21 denotes a sprue and reference signs 22 and 23 each denote a preform.

The pre-molded part 20 is cooled in the injection compression mold (injection mold) in a step 112 and then removed in a step 113 and fed to a cooling station or a storage unit (also cooling station) outside the injection compression mold (injection mold).

Figure 8B:
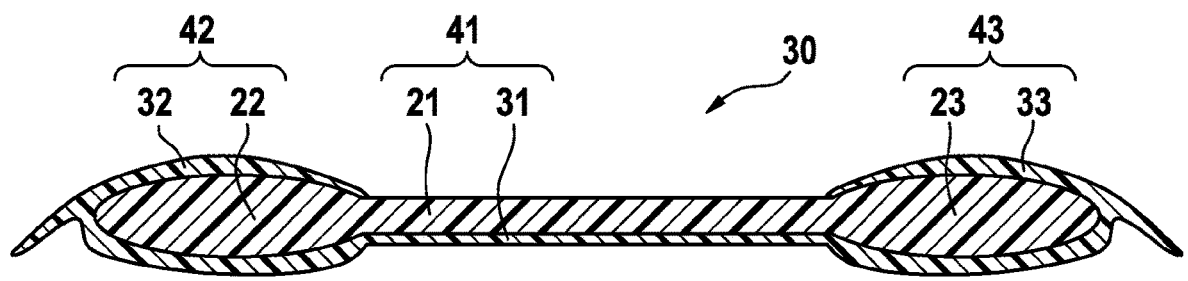
FIG. 8B shows an embodiment of an injection molded part.
Figure 8C:
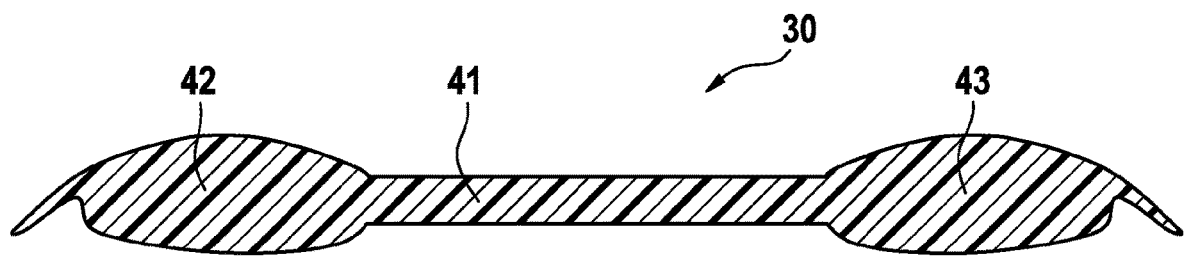
FIG. 8C shows the injection molded part according to FIG. 8B after joining the injection molding material (injection molding compound) of the two molding steps.
Figure 8D:
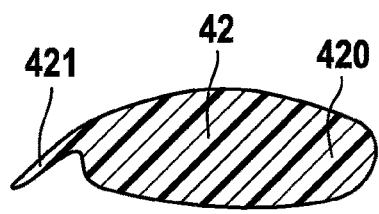
FIG. 8D shows separated automotive lens elements.
Figure 8D:
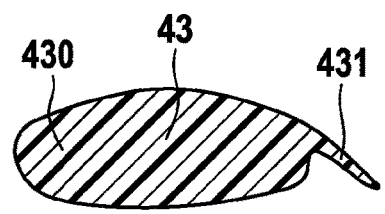
Figure 9:
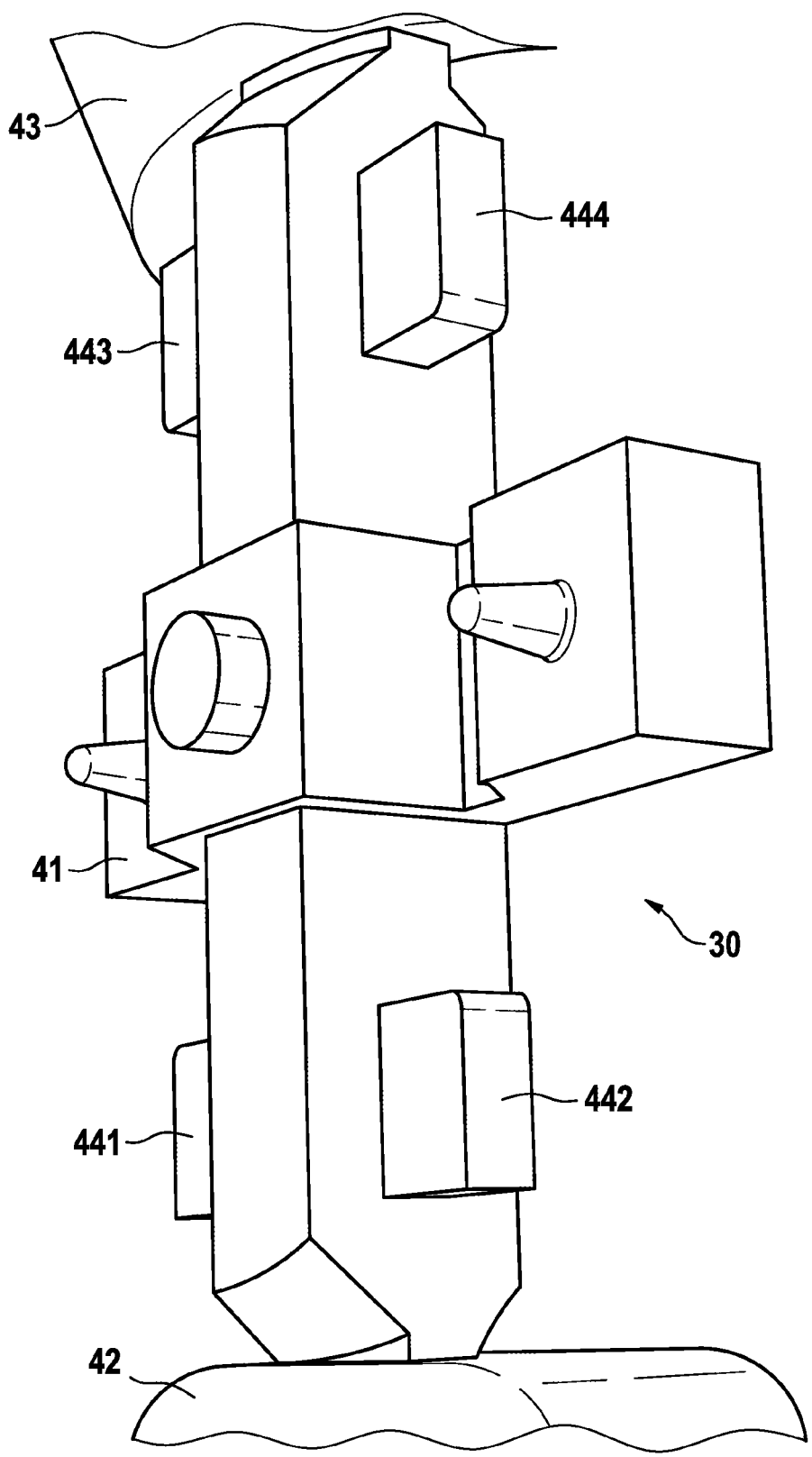
FIG. 9 shows a perspective view of a section of an embodiment of an injection molded part.

This is followed by a step 114 in which the pre-molded part 20 is arranged in a second injection compression mold. This is followed by an injection molding step analogous to injection step 111, or an injection-pressing step 115, in which the pre-molded part 20 is injection-pressed to form an injection molded part 30, as shown in FIG. 8B. Here, reference 21 in FIGS. 8A and 8B denotes the sprue of the pre-molded part 20 (see above), and reference sign 31 according to FIG. 8B denotes the additional sprue, with both sprues 21 and 31 forming a total sprue denoted by reference 41 in FIG. 8B. In FIG. 8B, reference sign 32 denotes injection molding material for overmolding the preform 22 to form a pre-lens element 42, and reference sign 33 denotes injection molding material for over molding the preform 23 to form a pre-lens element 43. FIG. 8C shows an injection molded part in a principle sketch or principle-like sketch, the injection molded part comprising the pre-lens elements 42 and 43 and the overall sprue 41 in which the injection molding material from the (two) injection molding steps has bonded. The pre-lens element 42 comprises a lens body 420 and a rim 421. The pre-lens element 43 comprises a lens body 430 and a rim 431. FIG. 9 shows a specific embodiment of an injection molded part. Here, the blind extensions designated by reference signs 441, 442, 443, 444 may also be omitted.

Step 115 is followed by a step 116 in which the injection molded part is cooled, followed by a step 117 in which the injection molded part is removed from the injection mold and further cooled. This is followed by a step 118 in which the total sprue 41 is separated from the pre-lens elements 42 and 43, so that pre-lens elements 42 and 43 are separated. From the pre-lens elements 42 or 43, (optical) lens elements are manufactured in a step 119. Step 119 can also be performed before step 118.

FIG. 10 shows a schematic view of an apparatus for implementing the process of producing optical lens elements described with reference to FIG. 7. Here, P1 denotes an injection press (injection molding machine) or injection mold for manufacturing a pre-molded part 20. 51 denotes a storage unit, and K1 denotes a cooling unit. Cooling unit K1 serves to transfer the pre-molded part 20 at a suitable temperature to the injection press (injection molding machine) or injection mold P2 for producing the injection molded part 30. In addition, individual pre-molded parts are phased into the storage unit 51 so that it holds, for example, a days production of pre-molded parts. In this way, mold changes and malfunctions can be compensated for by decoupling the processes implemented on the injection presses (injection molding machines) or injection molds P1 and P2 while simultaneously linking them. Mold changes and maintenance concerning the injection presses or injection molds P1 and P2 do not have to be synchronized in this way. If, for example, injection press P2 does not accept any pre-molded parts 20, these are placed in storage unit S1. If the cooling unit K1 is empty, a handling robot removes the pre-molded parts from the storage unit S1 and feeds them to the injection press (injection molding machine) P2.

In a further embodiment, it is provided that the pre-lens element is produced in three injection molding steps, the first injection molding step being performed on the injection press (injection molding machine) of the injection mold P1 and the second and third injection molding steps being performed on the injection press (injection molding machine) of the injection mold P2. Sixteen preforms are injected in one injection molding step, whereas eight preforms are injected in the second molding step and eight pre-lens elements are injected in the third molding step on the injection press (injection molding machine) of injection mold P2.

Figure 11:
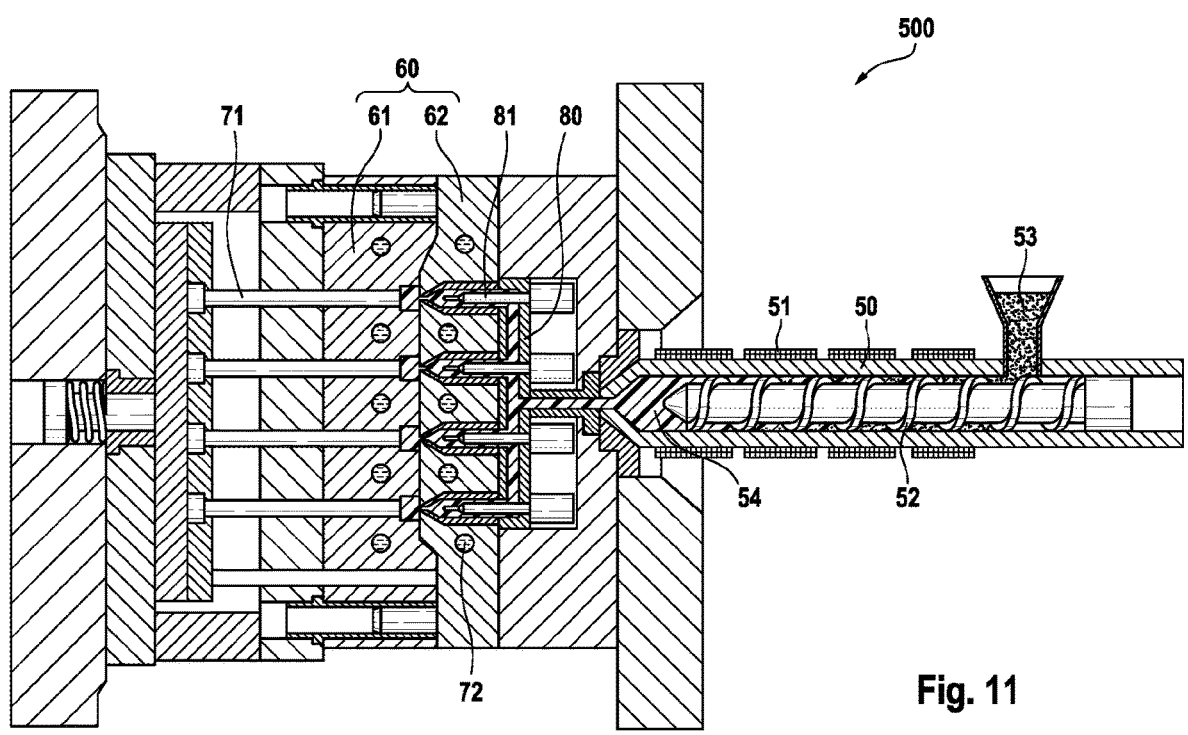
FIG. 11 shows an embodiment of an injection molding machine in a principal cross-sectional view.

FIG. 11 shows an embodiment of an injection molding machine 500 for use as an injection molding machine with an injection mold P1 or P2. The injection molding machine 500 comprises an injection molding unit 50 having a screw 52 and a heating system 51 for liquefying plastic, which is introduced in the form of granules into a material feed 53. The plastic liquefied by means of the heating system 51 is designated by reference sign 54.

The liquefied plastic 54 is then pressed into a hot runner system 80 and from there injected into an injection molding tool 60 via hot runner nozzles 81. The injection molding tool 60 comprises two partial molds 61 and 62 that can be moved apart to remove the pre-molded part or the injection molded part, depending on what is being produced. Reference numeral 72 denotes cooling channels in the injection mold 60.

Figure 12:
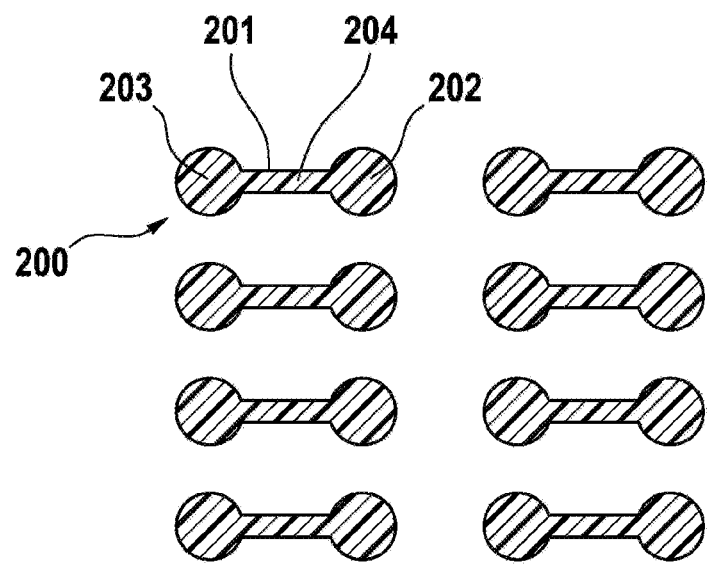
FIG. 12 shows an embodiment of the principle arrangement of pre-molded parts in a tool of an injection molding machine.
Figure 13:
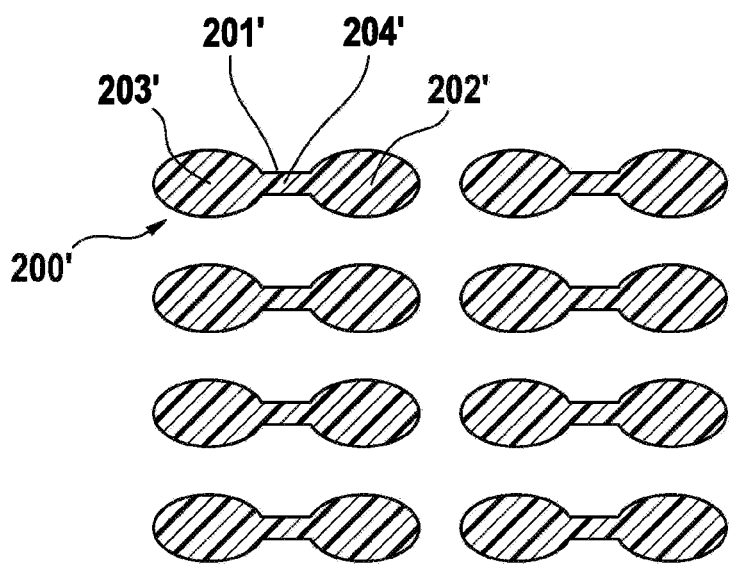
FIG. 13 shows another example of the principle arrangement of pre-molded parts in a tool of an injection molding machine.

In the present embodiment, pre-molded parts are molded eight at a time in a single molding step, as shown by way of example in FIG. 12. Here, reference numeral 200 denotes a pre-molded part with two preforms 202 and 203 connected to a sprue 201, and 204 denotes the injection point for pre-molded part 200. Reference numeral 71 in FIG. 11 denotes an ejector provided to press on preforms 202 and 203 to eject them from partial mold 61. The schematic representation in FIG. 12 shows the pre-molded parts 200 from a view from the partial mold 62 in the direction of the partial mold 61. The ejector 71, like the other ejectors shown, is raised out of the cross-sectional area of the representation in FIG. 11, so that it does not engage the sprue 201, as it might appear purely from the drawing, but rather the preforms 202 and 203. Injection molded parts are also produced in a similar manner. It is provided in a particularly manner that when the injection molded part or the pre-molded part to be injected is changed, a new mold is provided for injection molding a different pre-molded part with a same hot runner system. That is, the injection point 204 for the pre-molded part 200 is at the same location as the injection point 204' of the pre-molded part 200' shown in FIG. 13. In this case, the pre-molded part 200' comprises two pre-molded parts 202' and 203', which are connected to each other via a sprue 201'.

Figure 14:
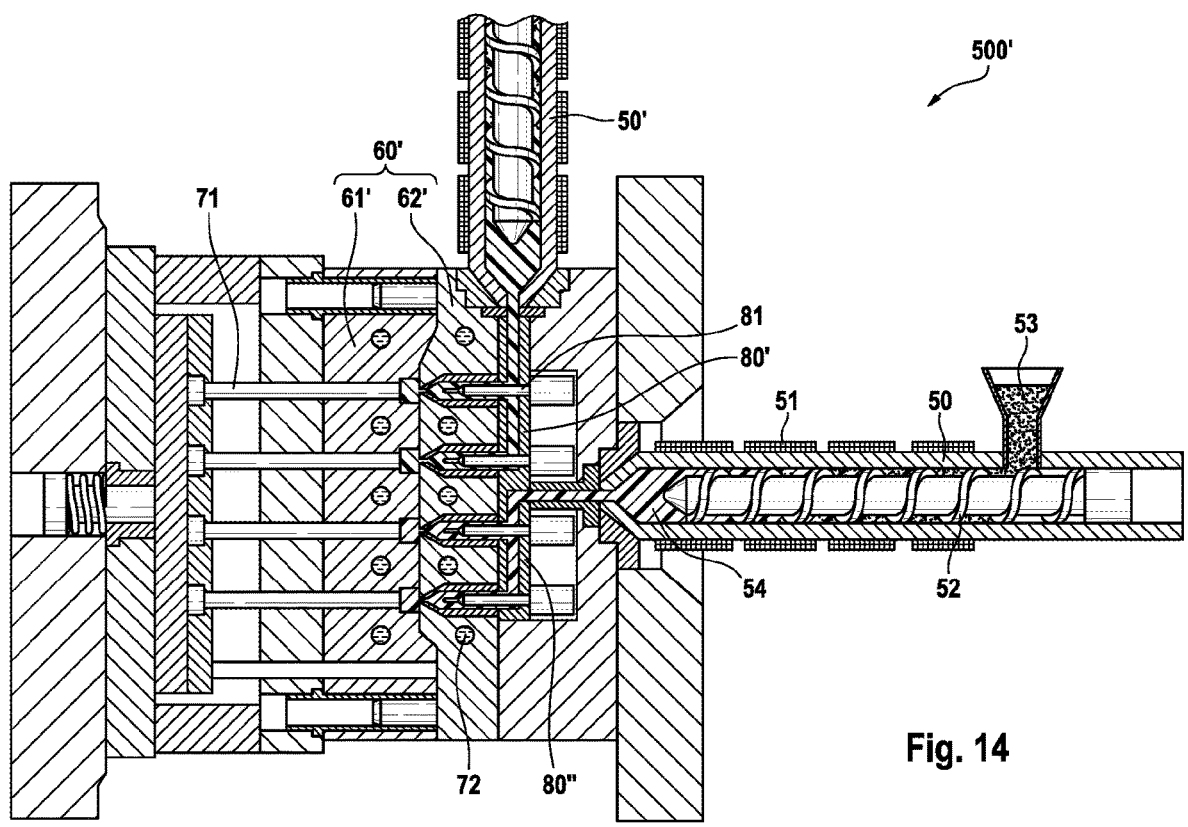
FIG. 14 shows another embodiment of an injection molding machine in a principal cross-sectional view.

For the production of injection molded parts, for example, an injection molding machine 500' shown in FIG. 14 can be used, which is modified compared to the injection molding machine 500. Identical reference signs as in FIG. 11 designate similar or identical elements. The injection molding tool of the injection molding machine 500' designated by reference sign 60' comprises two partial molds 61' and 62'. In contrast to the injection molding machine 500, the injection molding machine 500' has two hot runner systems 80' and 80". Here, the hot runner system 80" is supplied with liquid plastic by the injection molding unit 50, and the hot channel system 80' is supplied by an injection molding unit 50'. It may be provided that the pre-molded parts and the injection molded parts are injected in an injection molding machine such as injection molding machine 500'. It may be provided that the hot runner system 80" supplies or fills liquid plastic into the injection molds of the injection molding tool 60', which are used to inject preforms. After injection, the preforms are removed and cooled in the/a cooling unit K1 or the/a storage unit S1. After sufficient cooling, the preforms are inserted into the injection molds of the injection molding tool 60' of the injection molding machine 500', which is associated with the hot runner system 80'. In these injection molds, to which the hot runner system 80' is assigned, the preforms are over molded into injection molded parts or pre-lens elements.

In an exemplary embodiment of step 119, the pre-lens element is cooled in the injection press or injection mold P2 and/or after removal from the injection press or injection mold P2 in such a way that the plastic solidifies, wherein subsequently at least one surface of the pre-lens element provided as an optically effective surface—as shown in FIG. 10—is heated by means of a heating device HZV according to FIG. 10 in such a way that the plastic on the optically effective surface is moldable, for example to a depth of no more than 1000 micrometers, for example no more than 500 micrometers, for example no more than 100 micrometers, wherein the pre-lens element—as shown in FIG. 10—is pressed in a final contour mold EKF to form the lens element with the optically effective surface.

Figure 15:
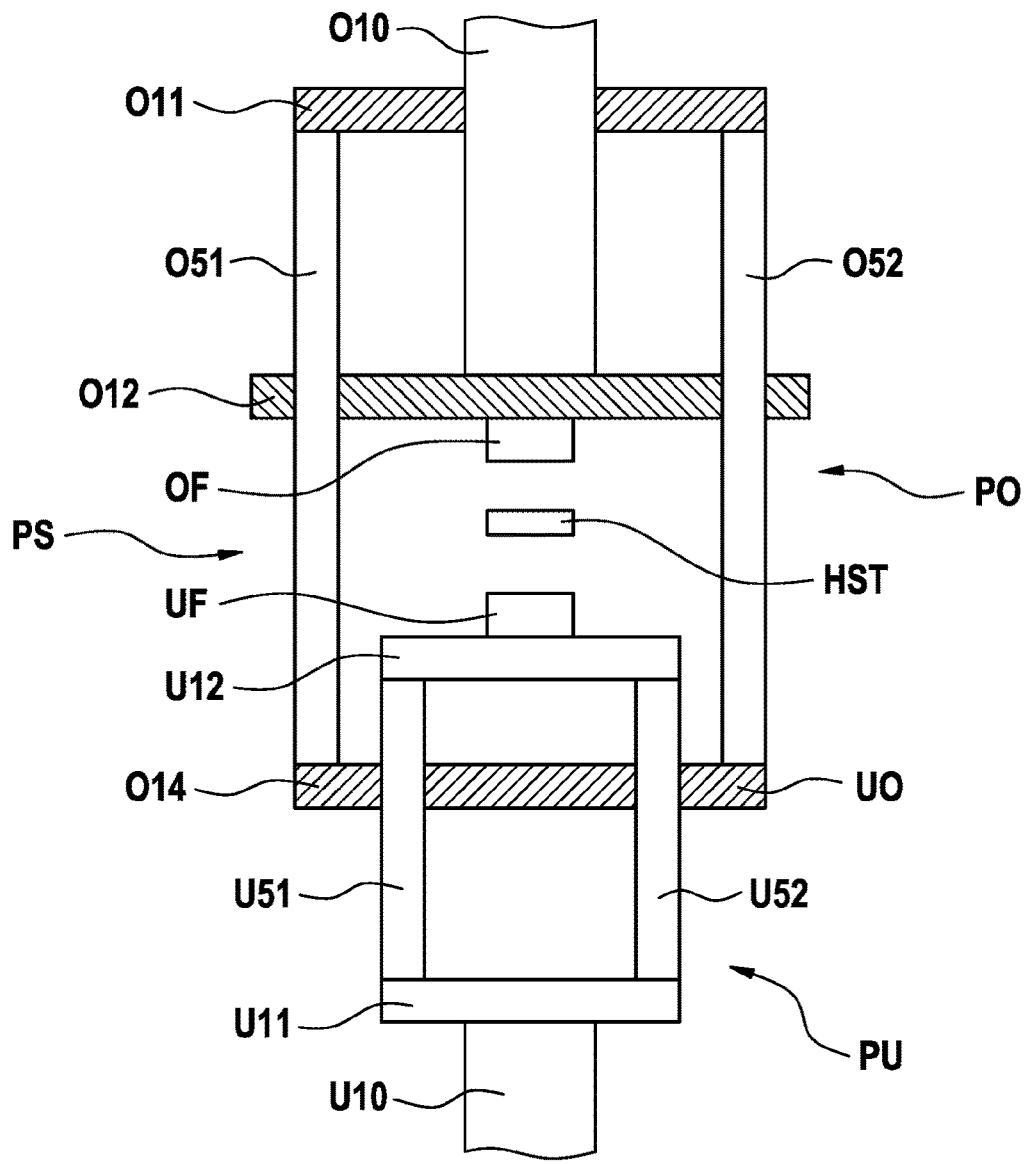
FIG. 15 shows an embodiment of a pressing station for pressing a contour of an optically effective surface (of a lens element) within a predetermined tolerance.

FIG. 15 shows a schematic diagram of a press station PS for pressing an optical lens element from a pre-lens element. The press station PS has an upper pressing unit PO and a lower pressing unit PU. For pressing, a mold OF (upper mold), which is moved by means of a press drive or by means of an actuator O10, and a mold UF (lower mold), which is moved by means of a press drive or by means of an actuator U10, are moved toward each other.

The mold OF and/or the mold UF are/is an embodiment example for a final contour mold EKF in the sense of the claims. For example, the upper surface of the pre-lens element may be heated and subsequently pressed by means of the mold OF. Alternatively or additionally, for example, the bottom side of the pre-lens element may be heated and subsequently pressed by means of the mold UF. It may be provided that the mold OF and/or the mold UF is also an implementation of the heating device HZV. For example, the pre-lens element may be deposited in the mold UF, heated in the mold UF, and then pressed by moving the mold OF and the mold UF toward each other such that the mold UF imprints a desired optically effective surface into the pre-lens element to produce the optical lens element.

The mold UF is connected to a mold-side movable connecting piece U12, which in turn is connected to an actuator-side movable connecting piece U11 by means of movable guide rods U51, U52. The actuator U10 is in turn connected to the actuator-side movable connecting piece U11, so that the mold UF can be moved by means of the actuator U10. The movable guide rods U51 and U52 extend through recesses of a fixed guide element UO in such a way that a deflection or movement of the movable guide rods U51 and U52 and thus of the mold UF perpendicular to the direction of movement is avoided or reduced or limited.

The press unit PO comprises an actuator O10, which moves the mold OF and is connected to a movable guide element O12. The press unit PO also comprises a frame formed by an actuator-side fixed connecting piece O11 and a mold side fixed connector O14 as well as fixed guide rods O51 and O52, which connect the actuator side fixed connector O11 to the mold-side fixed connector O14. The fixed guide rods O51 and O52 are guided by recesses of the movable guide element O12 so that they prevent, reduce or avoid movement or deflection of the mold OF orthogonal to the direction of movement of the actuator O10 or the mold OF.

In the example shown, the PO and PU press units are linked in that the fixed guide element UO is the same as the fixed connecting piece O14 on the mold side. This linking or interlinking of the two press units PO and PU of the press station PS achieves a particularly high quality (especially in terms of contour accuracy) of the lens elements or headlight lenses to be pressed.

For the press kinematics, various force-displacement—as well as displacement-time-curves can be implemented:
(i) Close and open press
(ii) Close press, hold time (for relaxation and retardation of the surface layer (in the area of the optically effective surface)) and open
(iii) Combination processes (i) and (ii), such as multiple pressing for the purpose of calibrating/improving the surface quality
(iv) Combination of processes (i) to (iii) with a vibration superimposition of the tool system In the method described, the heating device HZV and the final contour mold EKF are implemented as separate units or units arranged one after the other. However, it is also possible to integrate the heating device HZV and the final contour mold EKF, for example by means of a swiveling radiant heater HST, as shown as an option in FIG. 15. By means of the radiant heater, the mold UF and/or the mold OF can be heated. It may be provided that, after heating, a pre-lens element is deposited in the optionally heated mold UF. It may be provided that the upper side of the pre-lens element is subsequently heated by means of the radiant heater HST in order to achieve a temperature above TG in the pre-lens element close to the surface. It may be provided that at the same time the mold OF is heated by means of the heating power of the radiant heater HST. The mold UF and the mold OF are then moved towards each other in order to press or emboss the desired lens element from the pre-lens element through the closed mold formed by the mold UF and the mold OF.

Figure 16:
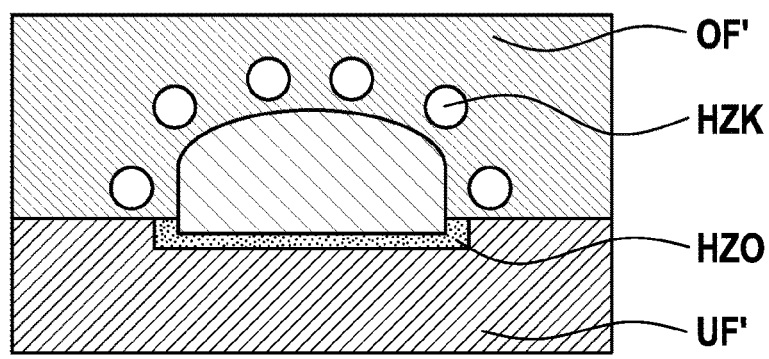
FIG. 16 shows an embodiment of an integration of a heating device and a final contour mold.

It can also be provided that the molds are heated by means of the concepts shown in FIG. 16. Here, OF' denotes a mold corresponding to mold OF, and mold UF' denotes a mold corresponding to mold UF. In a modification to the mold OF, the mold OF' has heating channels HZK for heating the mold OF'. Corresponding heating channels HZK may also be provided in the mold UF'. Alternatively, as shown, a heating device HZO is provided which forms a contour-matched resistance heating element, for example a milled copper insert, which is electrically or thermally insulated from the remaining part of the mold UF.

The disclosure specifies for example a headlight lens (predominantly) made of plastic or an optical lens element (predominantly) made of plastic that is particularly suitable for matrix headlights or matrix light or adaptive high beam. Examples of matrix headlights or adaptive high beams can be found at web.archive.org/web/20150109234745/http://www.audi.de/content/de/brand/de/vorsprung_durch_technik/content/013/08/Audi-A8-erstrahlt-in-neuem-Licht.html (accessed Sep. 5, 2019), www.all-electrocs.de/matrix-led-and-laser-light-offers-many-benefits/ (accessed Sep. 2, 2019), and www.next-mobility.news/led-in-the-vehicle-the-role-of-matrix-headlights-and-what-they-do-a-756004/ (accessed Sep. 2, 2019). It is desirable to reduce the cost of producing lens elements, especially on an industrial scale, for example for illumination purposes, for example for producing the aforementioned headlight lenses for vehicle headlights. By "making usable on an industrial scale" it is to be understood for example that a process is established which makes it possible to manufacture several thousand lens elements in a row with a low rejection rate without a violation of the set quality standards or tolerances. This is particularly true with regard to both geometric dimensions and optical properties. Headlight lenses, for example, are subject to narrow design criteria with regard to their optical properties or photometric reference values. This applies for example with regard to a bright-dark-boundary, as exemplified in Bosch—Automotive Handbook, $9^{th}$ edition, ISBN 978-1-119-03294-6, page 1040. Important photometric reference values are the gradient G of the bright-dark-boundary and the glare value HV of the vehicle headlight in which the headlight lens is installed. An example of the totality of photometric values to be observed is disclosed, for example, in Bosch—Automotive Handbook, $9^{th}$ edition, ISBN 978-1-119-03294-6, page 1040. Even higher quality requirements apply to optical lens elements for adaptive headlights or matrix headlights. For example, at a low rejection rate, several thousand lenses are to be produced while maintaining comparable photometric properties. A low rejection rate means for example a rejection rate of no more than 10%, for example no more than 5%, for example no more than 2%.

LIST OF REFERENCE SIGNS

1 motor vehicle
2 environmental sensors
3 controller
4 illumination device
5 objective, comprising headlight lens/lens element
10 vehicle headlight
20 pre-molded part
21 (first) sprue
22, 23 preform
30 injection molded part
31 (second or additional) sprue
32, 33 injection molding material/injection molding material for over molding a preform
41 gate or total sprue
42, 43 injection molded parts or pre-lens elements
50, 50' injection molding unit
51 heating system
52 screw
53 material feed
54 liquefied plastic
60, 60' injection molding tool
61, 62, 61', 62' partial mold
71 ejector
72 cooling channel
80, 80', 80" hot runner system
81 hot runner nozzle
111, 112, 113, 114,
115, 116, 117, 118,
119 step
200, 200' pre-molded part
201, 201' sprue
202, 202', 203, 203' preform
204, 204' injection point
410 light source arrangement
411 attachment optics
412 light exit surface
420, 430 lens body
421, 431 rim of a lens element
441, 442, 443, 444 blind extensions
500, 500' injection molding machine
P1, P2 injection press (injection molding machine) or injection mold of injection molding machine
K1 cooling
S1 storage unit
HZV, HZO heating device
EKF final contour mold
HZK heating ducts
HST radiant heater
L4 light
L5 illumination pattern L41 irradiated light
L51 flared areas
L52 dimmed areas
L53 curve light
M2 environment sensor system
M3 controller
M4 light emitting unit
M5 concave lens
M6 projection optics
M20 headlight
ML4 light
ML5 light
ML6 light distribution
PS press station
PO upper press unit
PU lower press unit
OF, OF' upper mold
UF, UF' lower mold
U10, O10 actuator
U11, U12 movable connecting piece
U51, U52 movable guide rods
UO fixed guide element
O11 actuator side connecting piece
O12 movable guide element
O14 form side connecting piece
O51, O52 fixed guide rods

The invention claimed is:

1. A method for producing an optical lens element, the method comprising:
providing a first injection mold;
providing a second injection mold;
providing a final contour mold, the final contour mold comprising a lower mold and an upper mold;
providing transparent plastic;
liquefying the transparent plastic;
injecting the liquefied transparent plastic into the first injection mold to form a preform;
subsequently cooling the preform;
placing the preform in the second injection mold;
injecting the liquefied transparent plastic into the second injection mold to form a pre-lens element,
cooling the pre-lens element such that the transparent plastic solidifies;
subsequently heating a surface of the pre-lens element intended as an optically effective surface in such a way that the solidified plastic at the surface of the pre-lens element intended as an optically effective surface is moldable to a depth of not more than 1000 micrometers;
placing the pre-lens into the lower mold; and
forming the optical lens element with the optically effective surface by moving the upper mold and the lower mold toward each other.

2. The method of claim 1, wherein at least 90% of the pre-lens element has a temperature below glass transition/transformation temperature (TG) of the transparent plastic when moving the upper mold and the lower mold toward each other.

3. The method of claim 2, wherein the surface of the pre-lens element intended as an optically effective surface is moldable to a depth of not more than 500 micrometers.

4. The method of claim 1, wherein at least 95% of the pre-lens element has a temperature below glass transition/transformation temperature (TG) of the transparent plastic when moving the upper mold and the lower mold toward each other.

5. The method of claim 1, wherein a pre-molded part is formed by injecting the liquefied transparent plastic into the first injection mold, wherein the pre-molded part comprises the preform and a sprue connected to the preform.

6. A method for producing an optical lens element, the method comprising:
providing an injection mold;
providing a final contour mold, the final contour mold comprising a lower mold and an upper mold;
providing liquefied transparent plastic
injecting the liquefied transparent plastic into the first injection mold to form a pre-lens element;
cooling the pre-lens element such that the transparent plastic solidifies;
subsequently heating a surface of the pre-lens element intended as an optically effective surface in such a way that the solidified plastic at the surface of the pre-lens element intended as an optically effective surface is moldable to a depth of not more than 1000 micrometers;
pressing the pre-lens element in a final contour mold to form the lens element with the optically effective surface, wherein at least 90% of the pre-lens element has a temperature below transition/transformation temperature (TG) of the transparent plastic when the pre-lens element is pressed in the final contour mold.

7. A method for producing an optical lens element, the method comprising:
providing a first injection mold;
providing a second injection mold;
providing a final contour mold;
providing transparent plastic;
liquefying the transparent plastic;
injecting the liquefied transparent plastic into the first injection mold to form a preform;
subsequently cooling the preform outside the first injection mold;
placing the preform in the second injection mold;
over molding the preform with the liquefied transparent plastic injected into the second injection mold to form a pre-lens element;
cooling the pre-lens element such that the transparent plastic solidifies;
subsequently heating a surface of the pre-lens element intended as an optically effective surface in such a way that the solidified plastic at the surface of the pre-lens element intended as an optically effective surface is moldable;
pressing the pre-lens element in the final contour mold to form the lens element with the optically effective surface;
wherein the surface of the pre-lens element intended as an optically effective surface is moldable to a depth of not more than 1000 micrometers.

8. The method of claim 7, wherein a pre-molded part is formed by injecting the liquefied transparent plastic into the first injection mold, wherein the pre- molded part comprises the preform and a sprue connected to the preform.

9. The method of claim 7, wherein at least 90% of the pre-lens element has a temperature below glass transition/transformation temperature TG of the transparent plastic when the pre-lens element is pressed in the final contour mold.

10. The method of claim 7, wherein at least 95% of the pre-lens element has a temperature below glass transition/transformation temperature TG of the transparent plastic when the pre-lens element is pressed in the final contour mold.

11. The method of claim 7, wherein the surface of the pre-lens element intended as an optically effective surface is moldable to a depth of not more than 500 micrometers.

* * * * *